United States Patent [19]
Holt

[11] Patent Number: 5,883,858
[45] Date of Patent: Mar. 16, 1999

[54] METHOD AND APPARATUS FOR INFLUENCING BEHAVIOR OF AQUATIC ANIMALS BY BROADCASTING PREDEFINED SIGNALS UNDER WATER

[76] Inventor: Steven P. Holt, 4929 Mountain Ridge, Ada, Mich. 49301

[21] Appl. No.: 812,114

[22] Filed: Mar. 5, 1997

Related U.S. Application Data

[60] Provisional application No. 60/013,370 Mar. 15, 1996.
[51] Int. Cl.⁶ ..................................................... A01M 29/02
[52] U.S. Cl. ............................................................ 367/139
[58] Field of Search .............................. 367/139; 43/17.1; 116/22 A; 119/219; 340/384.2

[56] References Cited

U.S. PATENT DOCUMENTS

| | | |
|---|---|---|
| 2,577,229 | 12/1951 | Carnes . |
| 2,757,475 | 8/1956 | Pankove . |
| 2,784,399 | 3/1957 | Smith . |
| 2,920,318 | 1/1960 | Balcken et al. . |
| 2,932,110 | 4/1960 | Kilpinen et al. . |
| 2,939,240 | 6/1960 | Goodman . |
| 3,105,233 | 9/1963 | D'Amore et al. . |
| 3,120,073 | 2/1964 | Brunton . |
| 3,310,902 | 3/1967 | Godby . |
| 3,416,254 | 12/1968 | Bornzin . |
| 3,683,356 | 8/1972 | D'Amore . |
| 3,885,338 | 5/1975 | York . |
| 4,583,313 | 4/1986 | Dugan, Jr. . |
| 4,805,339 | 2/1989 | Fuentes et al. . |
| 4,835,721 | 5/1989 | Becker et al. . |
| 4,932,007 | 6/1990 | Suomala ................................... 367/139 |
| 4,955,005 | 9/1990 | Loeffelman .............................. 367/139 |
| 5,099,455 | 3/1992 | Parra . |
| 5,117,572 | 6/1992 | Parra . |
| 5,134,592 | 7/1992 | Parra . |
| 5,168,471 | 12/1992 | Parra . |
| 5,168,473 | 12/1992 | Parra . |
| 5,168,474 | 12/1992 | Parra . |
| 5,251,187 | 10/1993 | Parra . |
| 5,282,178 | 1/1994 | Hill et al. . |
| 5,349,774 | 9/1994 | Parra . |

OTHER PUBLICATIONS

Text entitled "The Behavior of Teleost Fishes", edited by Tony J. Pitcher, 1986, John Hopkins University Press; Chapter 5, Underwater Sound and Fish Behavior (pp. 114–151), Chapter 7, Role of Lateral Line in Fish Behavior (pp. 177–202).

*Primary Examiner*—Daniel T. Pihulic
*Attorney, Agent, or Firm*—Rader, Fishman, Grauer & Mc Garry

[57] ABSTRACT

Signals generated electronically at a variety of frequencies are broadcast under water in the presence of various species of aquatic animals and any reaction of the aquatic animals in response to the broadcast signals is noted. A frequency synthesizer is used with an underwater transducer to generate and broadcast signals at a variety of frequencies and frequency synthesizer control words associated with observed behavior are recorded. Subsequently, the recorded control words are applied to a frequency synthesizer connected to an underwater transducer to influence behavior of identified species of underwater animals in a desired manner. Indices representative of various recorded signals may be embodied in a submersible device, such as a lure or the like, from which a reproduced signal may be broadcast to attract, repel, or otherwise influence the behavior of identified species of aquatic animals.

8 Claims, 1 Drawing Sheet

METHOD AND APPARATUS FOR INFLUENCING BEHAVIOR OF AQUATIC ANIMALS BY BROADCASTING PREDEFINED SIGNALS UNDER WATER

BACKGROUND OF THE INVENTION

1. Cross-Reference to Related Application

This application claims the benefit of U.S. Provisional Application No. 60/013,370, filed on Mar. 15, 1996.

2. Field of the Invention

The invention relates to a method and apparatus for creating and broadcasting predefined signals designed to selectively modulate the behaviors of species of fish, marine mammals, crustaceans, etc.

3. Background Art

It has long been known that acoustical signals are both generated and detected by aquatic animals and are an important communications medium. Furthermore, certain species of aquatic animals appear to transmit an acoustical signal unique to the species and equivalent to a "signature." The signature can be detected and may be recognized as indicative of available prey or indicative of the presence of a predator. Sound corresponding to such a signature may be reproduced and broadcast underwater and the behavior of fish and other aquatic animals may be influenced or controlled. Many aquatic animals produce "calls" indicative of social behavior or distress, or the like, and the corresponding underwater sounds influence the behavior of both predator and prey. The behavior of aquatic animals is also known to be influenced by weather disturbances which create sound transmitted from the surface of the water.

As described in my prior patent, U.S. Pat. No. 5,177,891, issued Jan. 12, 1993, and entitled "Game Fish Attracting Device," methods for recording underwater acoustical signals are known. Recording acoustical signals produced by particular species of aquatic animals involves isolating members of that species and detecting signals by means of an underwater acoustical transducer. However, isolating different species in an area where underwater sounds can be recorded is often difficult and at least inconvenient. Furthermore, in such a setting it is likely that the species of aquatic animals will only generate certain types of signals and not, for example, the kind of signals that would be generated in the presence of a predator or the kind of signals that would be produced by a predator in pursuit of prey, or those that might be associated with certain social behaviors.

The concept of influencing or controlling the behavior of aquatic animals, which term is understood to include fish, marine mammals, crustaceans, and any other animals who make water their habitat, has wide application. Such control or manipulation may be used in many applications, including sport fishing, commercial fishing, scuba diving, marine research, selective commercial netting, etc. An example of the latter application would be repulsion of dolphins from commercial tuna nets. The same principles may be applied in repelling sharks or other predators.

One prior art approach to attracting fish to a particular location is to retain a number of fish in a tank, or the like, and to record their sounds for rebroadcast at a later time. One problem with that approach is that the sound that is being recorded may include ambient noise or may be distorted by echoes, or the like, occurring in the tank, which do generally not occur in the natural habitat. As a result, the broadcast sounds do not correspond directly to the sounds that would normally be produced by a particular species of aquatic animals in a natural habitat.

SUMMARY OF THE INVENTION

In accordance with the present invention, signals generated electronically at a variety of frequencies are broadcast under water in the presence of various species of aquatic animals and the behavior or reaction of the aquatic animals in response to the broadcast signals is noted. The broadcast and observation may be done in a vessel, such as a tank, or in open water areas. When it is determined that a particular underwater signal causes an observable effect in various species of aquatic animals, such as attraction, fleeing, curiosity, feeding response, defensive response or movement to different depths, indices which define the particular signal causing a particular behavior are recorded. In accordance with one aspect of the invention, a frequency synthesizer or the like is used to selectively generate signals at a large number of frequencies. These may be simple tones or complex frequencies. The signals are transmitted under water as acoustical vibrations, referred to herein as sounds but meant to include both sonic and sub-sonic disturbances in the water. Such sounds may be representative of vibrations produced by aquatic animals or the like or by water surface disturbances and other disturbances in the water. The transmitted signals may be used by fisherman, divers, or any other applications where it is desirable to control behaviors of aquatic animals, etc. The behavior alteration can include any number of responses, including attraction, feeding, aggression, repelling, fleeing, reproductive behavior, aggregation, shoaling, migration, movements up or down, etc.

The characteristics of a particular signal generated by the frequency synthesizer, and observed to have a particular effect on a particular species of aquatic animals, may be identified by noting particular input control words or input settings of the synthesizer producing the sound which causes the observed effect. In accordance with one aspect of the invention, a synthesizer device may be installed in an underwater housing and controlled by means of a computer or other input device which selectively applies input signals to a frequency synthesizer in order to selectively produce output signals corresponding to the signal noted as having the desired effect. Alternatively, the signal generated by the synthesizer may be recorded by means of an underwater microphone. Indices representative of the recorded signal may be embodied in a submersible device, such as a lure, from which a reproduced signal may be broadcast in a manner disclosed in my prior patent U.S. Pat. No. 5,177,891.

In accordance with a further aspect of the invention, sound signals recorded from an underwater environment are modified and improved to remove signal aberrations, such as echoes or ambient noise, which can be identified as attributable to the environment in which the sound was recorded.

BRIEF DESCRIPTION OF THE DRAWING

A preferred embodiment of the invention is described below with reference to the drawing in which.

DETAILED DESCRIPTION

Figure 1:
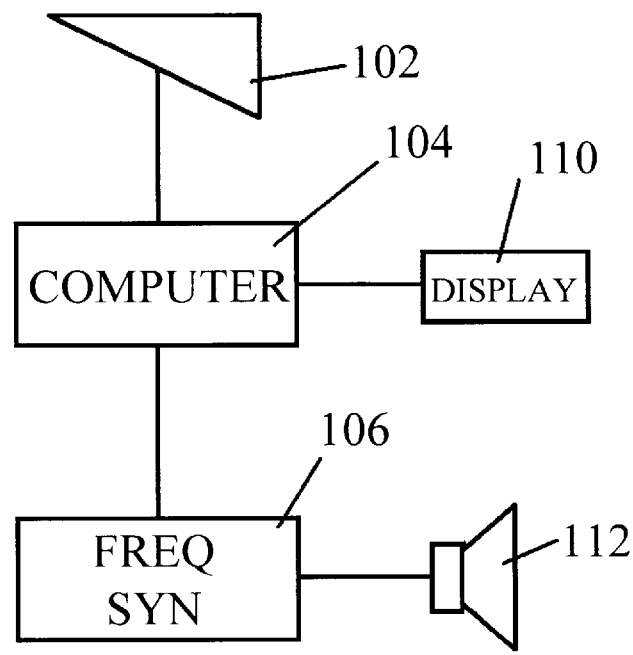
FIG. 1 is a block diagram representation of an arrangement for broadcasting signal of different frequency characteristics in a test environment.

FIG. 1 is a block diagram representation of an arrangement for broadcasting signals at a plurality of different frequencies in an underwater test area in which aquatic animals of identifiable species are known to be present, for the purpose of determining the characteristics of underwater signals which cause a change in behavior of various species of aquatic animals. The arrangement of FIG. 1 comprises a computer 104 which may, for example, be a standard microprocessor which is programmed to present a plurality of different data words to a frequency synthesizer 106. The data words to be applied by the computer 104 may, by way of example, be controlled by an input keyboard 102. A display 110 connected to the computer 104 may be used to display the identity of the data word transmitted to the frequency synthesizer 106. The frequency synthesizer 106 has an output connected to an acoustical transducer 112 which may be disposed in the underwater test area where aquatic animals of identifiable species are gathered. The frequency synthesizer 106 is a well known device. It may, for example, be a synthesizer such as described in U.S. Pat. No. 4,835,721, or the like, which patent is incorporated by reference herein. As described in that patent, that synthesizer is particularly adapted for use in synthesizing acoustical signatures of objects in an undersea environment. The output signal of synthesizer 106, which is directly related to input signals from the computer 104, is applied to the transducer 112. The computer 104 is preferably programmed to apply a variety of control words to the frequency synthesizer 106 under control of the keyboard 102. The frequency synthesizer may be controlled to repeatedly present a particular sound pattern until a new input word is presented. While a particular sound pattern is being broadcast by the transducer 112, the behavior of various species of aquatic animals in the area surrounding the transducer 112 is observed. In this manner, the behavior or change in behavior of various species of aquatic animals in response to a particular output signal of the transducer 112 may be observed, correlated and recorded. The output signal of the transducer 112 may be defined in terms of output of the keyboard 102, the output of the computer 104, or the output of the frequency synthesizer 106.

Figure 2:
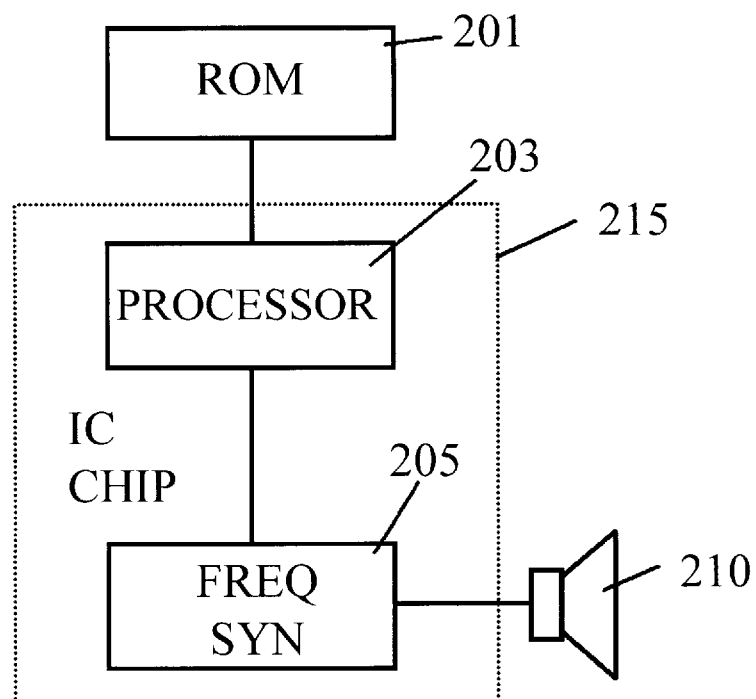
FIG. 2 is a block diagram representation of an arrangement for broadcasting signals of known frequency characteristics.

FIG. 2 is a block diagram representation of a signal broadcasting arrangement which may be used to broadcast underwater signals designed to influence behavior of various species of aquatic animals. The data recorded relative to changes in behavior in response to various outputs of synthesizer 106, defined in terms of output signals from keyboard 102, may subsequently be used to load a read-only memory (ROM) 201, shown in FIG. 2, to provide input to a processor 203. The processor 203 may be a known and commercially available microprocessor. The processor 203 may be the same as the computer 104 and the data stored in ROM 201 may correspond to outputs of the keyboard 102. Alternatively, the data in ROM 201 may correspond to control generated by the computer 104 in response to selected inputs from keyboard 102. Instead of processor 203, a memory access circuit, such as described in my prior U.S. Pat. No. 5,177,891, may be used to apply appropriate control words stored in the memory 201 to frequency synthesizer 205. Referring again to FIG. 2, processor 203 reads the data from ROM 201 and provides corresponding input data to the frequency synthesizer 205. The input/output characteristics frequency synthesizer 205 preferably correspond directly to those of synthesizer 106. In this manner, the input data provided to the frequency synthesizer 106, which caused the noted behavior of identified species of aquatic animals, is applied to frequency synthesizer 205. The frequency synthesizer 205 is connected to transducer 210 which is disposed underwater. Transducer 210 broadcasts a signal corresponding to the signal generated by the transducer 112, which resulted in observed change in behavior. The electrical/acoustical characteristics of the two transducers 210, 112 are preferably nearly identical. The synthesized sounds generated by the frequency synthesizer 205 may be any identified behavior modifying sounds corresponding to naturally occurring or otherwise identified underwater sounds or a reproduction of such sounds.

The processor 203 and frequency synthesizer 205 may be integrated in a single integrated circuit chip and installed in a fishing lure or the like in a manner described in my earlier patent, U.S. Pat. No. 5,177,891, which patent is incorporated by referenced herein. The ROM 201 is preferably pluggably connected to the integrated circuit chip 215 such that a number of different ROMs may be selectively plugged into the IC chip to control the circuitry to generate different sound patterns for the purposes of attracting or repelling different species of aquatic animals.

As an alternative to providing a frequency synthesizer in a lure, the analog output signals of frequency synthesizer 106 may be converted to digital signals and stored in a ROM. The behavior modifying sounds may then be generated by applying the data from such a ROM to transducer 210 by use of circuitry disclosed in my prior patent, U.S. Pat. No. 5,177,891.

As a further alternative, an arrangement may be used to record the acoustical signals generated underwater by the configuration of FIG. 1 and noting which of the signals produce various kinds of behavior. Such an arrangement for recording underwater signals is described in my prior patent, U.S. Pat. No. 5,177,891. As described therein, data representative of the recorded information is stored in a ROM which may be pluggably connected to an integrated circuit chip within a lure. The data in the ROM defines the signals to be broadcast from the lure and access circuitry reads data from the ROM and applies corresponding electrical signals to the transducer. Such access circuitry is described in my prior patent U.S. Pat. No. 5,177,891.

It will be understood that the information regarding the behavior of various species of aquatic animals in response to a signal generated by the frequency synthesizer 106, as described with respect to FIG. 1, may also be used with an onboard computer in a manner generally described in my prior patent U.S. Pat. No. 5,177,891. The circuit configuration of FIG. 2 may be readily used in such an onboard installation. A floppy disk or other convenient storage device may be used instead of the ROM 201 to conveniently provide the processor 203 with data defining the desired output of the frequency synthesizer 205.

While the invention is described herein with reference to the specific frequency synthesizer disclosed in U.S. Pat. No. 4,835,721 any number of other frequency synthesizers capable of producing output signals at a desired frequency range may be used.

What is claimed is:

1. A method of controlling behavior of aquatic animals under water, the method comprising:

placing an underwater microphone in an underwater environment in the presence of a known species of aquatic animals;

detecting and recording acoustical signals representing sounds from the underwater environment, including sounds produced by the known species of aquatic animals;

modifying the recorded acoustical signals to remove signal components not attributable to sounds generated by the known species of aquatic animals; and broadcasting the modified and recorded acoustical signal in an under water environment to influence behavior of aquatic animals in the under water environment.

2. Apparatus for influencing behavior of aquatic animals in an underwater environment comprising:

a memory storing data representative of recorded and synthetically-generated acoustical signals associated with identifiable behavior of identified species of aquatic animals;

signal processing apparatus connected to the memory for periodically reading data in said memory and responsive to data stored in the memory to periodically generate transducer control signals; and a transducer connected to the signal processing apparatus and disposed in a the underwater environment and responsive to the transducer control signals to periodically broadcast recorded, synthetically-generated acoustical signals corresponding to the acoustical signals associated with the identifiable behavior to influence behavior of aquatic animals in the underwater environment.

3. An apparatus in accordance with claim 2 wherein the memory is a ROM.

4. An apparatus according to claim 2 wherein the stored memory correlates at least one identifiable behavior of multiple species of aquatic animals with at least one stored acoustic signal.

5. An apparatus according to claim 4 wherein the memory is a digital storage medium and the data is stored in digital form.

6. An apparatus according to claim 2 wherein the apparatus is a fishing lure.

7. An apparatus according to claim 2 wherein the identified behavior comprises attracting the fish to a given location.

8. An apparatus according to claim 2 wherein the stored data correlates at least one identifiable behavior of multiple species of aquatic animals with multiple stored acoustic signals.

* * * * *